April 3, 1956 G. R. DUNCAN 2,740,377
STALL ARRANGEMENT AND VACUUM CONTAINER MILKING SYSTEM
Filed May 17, 1954 2 Sheets-Sheet 1
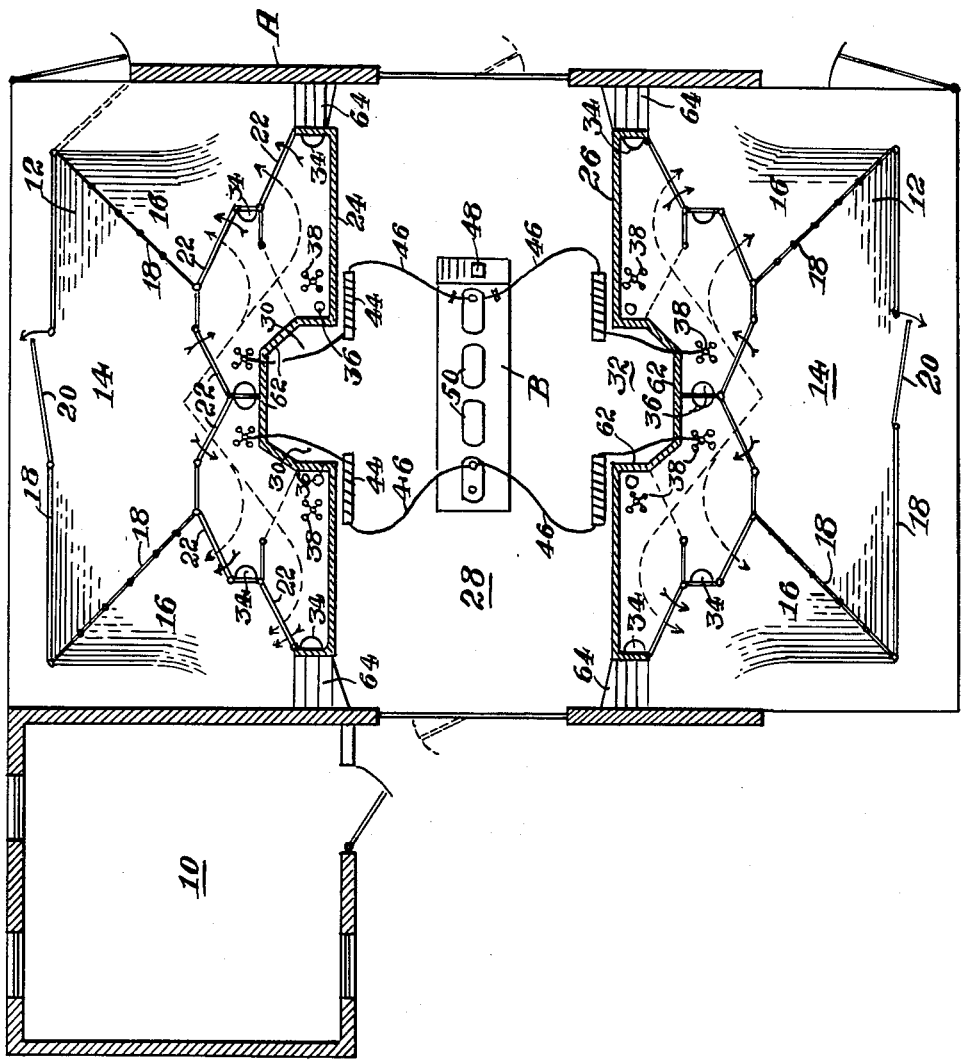
Fig. 1.
INVENTOR
GEORGE R. DUNCAN.
ATTORNEYS

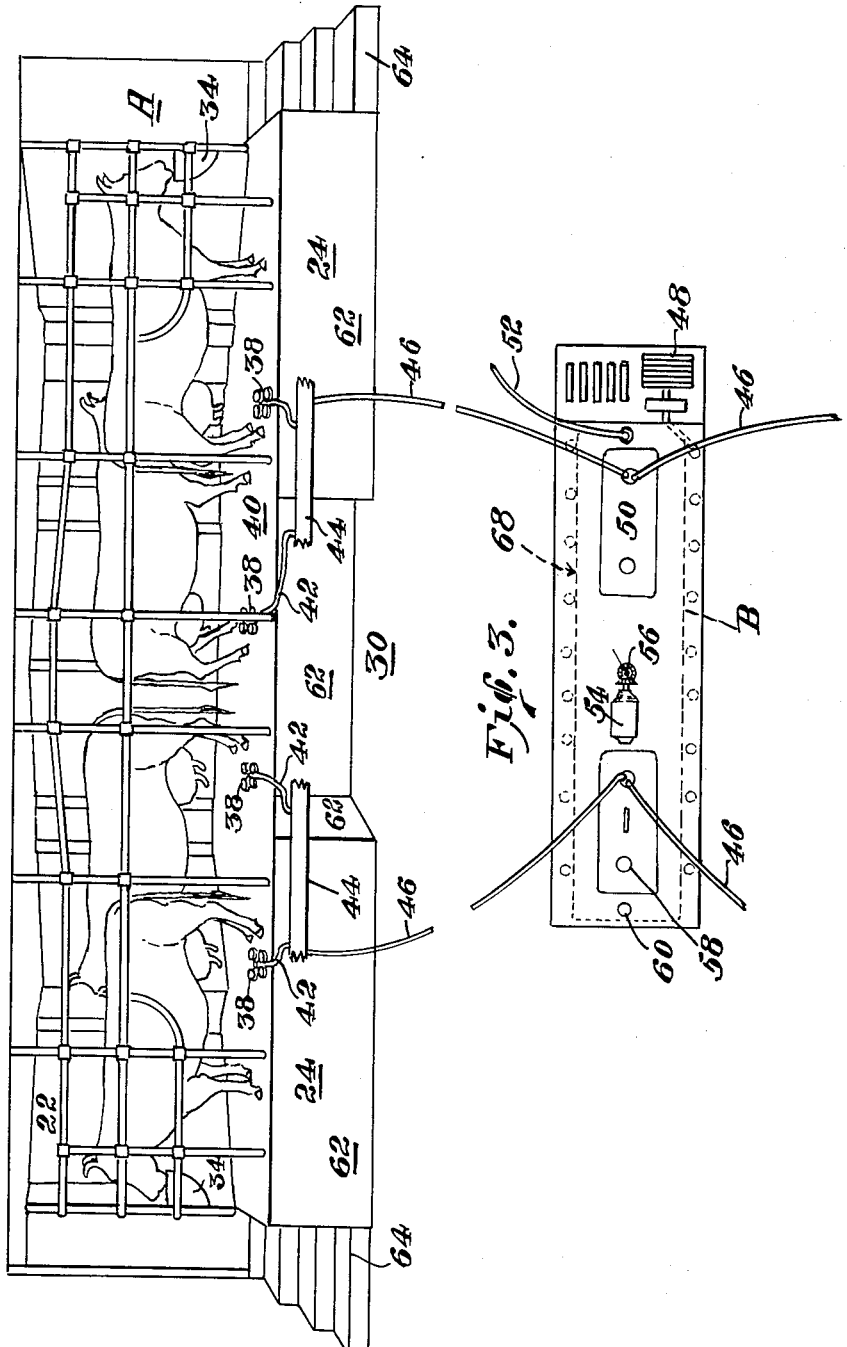

United States Patent Office 2,740,377
Patented Apr. 3, 1956

2,740,377

STALL ARRANGEMENT AND VACUUM CONTAINER MILKING SYSTEM

George R. Duncan, Washington, Mo., assignor to Zero Manufacturing Company, Washington, Mo., a corporation of Missouri Application May 17, 1954, Serial No. 430,266

10 Claims. (Cl. 119—14.03)

The present invention relates to a stall arrangement and vacuum container milking system which is an improvement of the construction disclosed in my Patent No. 2,512,094, granted June 20, 1950, and other patents granted to me.

An object of the invention is to provide a stall arrangement for simultaneously milking a plurality of farm animals from a central position wherein the milk as it comes from said animals is caused to flow into a bulk milk tank, or similar containing means.

A further object is to provide an arrangement whereby a maximum number of farm animals may be concentrated for milking purposes adjacent to an operator's compartment whereby after milking the animals may be caused to move from the milking station, and a new group of unmilked animals moved to their proper positions for simultaneously milking them. This operation may be repeated until the entire herd has been milked.

Another object is the provision of a novel stall arrangement whereby to save a maximum amount of space within a compartment or other enclosure.

A further object is to provide milking equipment of the non-handling type, wherein the milking hose from the sets of teat cups are of a minimum length to thereby greatly shorten the amount of hose that must be cleaned following the milking operation.

Yet another object is the provision of a stall arrangement of the dual type wherein groups of stalls are located on opposite sides of the bulk milk cooler.

Other objects will appear hereinafter throughout the specification.

In the drawings:

Figure 1 is a top plan view of the stall arrangement and vacuum container milking system;

Figure 2 is a side elevational view of one of the groups of stalls; and

Figure 3 is a top plan view of a typical bulk milk receptacle.

As will be noted by reference to Figure 1 the location and construction of the sets of stalls greatly facilitates the milking of a plurality of farm animals, such as cows. The present construction speeds up the milking of a plurality of cows wherein the cows are simultaneously milked in groups. The construction shown is of material assistance to dairy farm operators. The stall arrangement and vacuum container milking system of this invention further reduces the use of manual labor during the milking operation.

Referring to the figures, the letter A designates a milk house or other enclosure, and B shows a milk cooler, such as a bulk milk tank located within a refrigerator. Such milk house usually is provided with a wash room 10. The milk house further includes twin ramps 12, each having entrance inclined portions 14 and exit inclined portions 16. The animals are kept within suitable pens or enclosures 18, and after milking are ordinarily let out to pasture by the exit ramp portions 16. The entrances to the enclosure, and to the stalls are controlled by doors 20 and 22, respectively.

The groups of raised stalls are indicated by numerals 24 and 26, each group being located on opposite sides of the bulk milk cooler B in a space 28. In this space there are two milking operator stations 30 and 32.

Each group of stalls preferably provides for the positioning of four cows which may be simultaneously milked by the milking operator located at station 30 or station 32. As will be noted by reference to Figures 1 and 2, the cows are arranged so that the cows of each pair of the two pairs are in echelon, in each group of raised stalls. Moreover, each pair of cows is in back to back arrangement with the other pair of cows of that group so that the four sets of teat cups can be readily connected and disconnected from the udders of the cows of that group when the milking operation is completed. A new group of cows can then be moved to take the place of the cows which have been milked.

Referring again to Figures 1 and 2, each stall comprises a feed box 34 and a sump 36. Each set of teat cups is indicated by the numeral 38 and the raised platform is shown at 40.

The movements of the animals to and from the milking stalls is indicated by the arrows in Figure 1.

It will be noted that portions of the enclosures 18 extend up the ramps so as to divided the exit portions from the entrance portions thereof.

Flexible short length milk lines 42 lead from each set of teat cups to the longitudinally extending milk line 44, the end of which have been broken away. Outlet flexible milk lines 46 lead from milk line 44 to the bulk milk cooler B. The bulk milk receptacle B is preferably provided with refrigeration producing means 48 having thermostatic means thereon (not shown) for regulating the temperature of the refrigerant which cools the bulk milk container within the cooler B.

Referring to Figure 3 the bulk milk cooler B may be provided with a plurality of covers 50 to which access may be obtained to the inner shell of the cooler providing the container for the milk as it comes from the lines 46. The shell comprises the milk receptacle means 68 shown in dotted lines in Figure 3. The cooler may also be provided with a vacuum pipe 52. An electric motor 54 is preferably drivingly connected to the shaft 56 having one or more stirring means, not shown, located on said shaft within the inner shell for gently stirring the milk contents within said shell during the milking operation, whereby to cause a more complete heat exchange between the cold walls of the shell and the milk. The numeral 58 represents the suck-out pipe and 60 the blow-out pipe.

As shown in Figures 1 and 2 the milking operator station includes a wall or walls 62 forming part of each group of stalls. It will be understood that instead of the angled walls shown a rounded or semi-circular wall may be used without modifying this inventive concept.

As will be noted by reference to these figures access to the stalls from the milking operator's station and from the aisle in which the milk cooler is located, may be had by means of either pair of steps 64 that form part of each group of raised stalls. The doors 22 are operated from the milker's station 30 by any suitable operating means, forming no part of the present invention.

As will be apparent from an inspection of the figures and from the foregoing description the cows to be milked are kept within the enclosures 18 until milking time, at that time they are driven up ramp means 12 to the group of stalls 24 and/or 26, the animals being arranged in each group as shown in Figure 2. At this time the groups of teat cups 38 are attached to the animals' udders and the milking operation is started. It is to be assumed that prior to the start of the milking operation the refrigeration producing means is in operation in order that the milk may flow directly from the cows into the cooled container means within the bulk milk cooler B. As soon as the milking operation is completed of either group of animals, there being four to a group, the sets of teat cups are detached and the animals driven down the exit inclined portions 16 to pasture and a new group is stationed in each group of stalls 26 and the operation repeated. In this manner a large number of animals may be milked within a minimum of time, in a most sanitary manner, and with the least expenditure of physical exertion by the milking operator or operators.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a structure for milking farm animals and for conveying the milk to a cooled container means as it comes from the animals comprising at least one raised platform having thereon means for defining two pairs of stalls for positioning two pairs of farm animals with each pair in back to back position to the other pair and with their udders in close proximity to each other, the front portions of one pair of stalls facing away from the front portions of the other pair of stalls on said platform, and the rear portions of the said one pair of stalls facing the rear portions of the other pair of stalls, each pair of stalls comprising one stall in echelon to the other stall of that pair, mechanical milking means including four sets of teat cups located in close proximity to each other adjacent the animals' udders whereby each set may be readily attached for milking the said two pairs of farm animals, a milk receiving space having therein a mechanical refrigerator, said mechanical milking means further including milk line means connected to each set of teat cups and leading into said refrigerator for connection into a milk receptacle means located within said refrigerator, said mechanical milking means also further including a source of vacuum having a vaccum pipe leading to the interior of said milk receptacle means.

2. In a structure for milking farm animals and for conveying the milk to a cooled container means as it comes from the animals comprising two raised platforms having thereon means for defining two pairs of stalls for positioning two pairs of farm animals with each pair in back to back position to the other pair and with their udders in close proximity to each other, the front portions of one pair of stalls facing away from the front portions of the other pair of stalls on said platform, and the rear portions of the said one pair of stalls facing the rear portions of the other pair of stalls, each pair of stalls comprising one stall in echelon to the other stall of that pair, mechanical milking means including four sets of teat cups located in close proximity to each other adjacent the animals' udders whereby each set may be readily attached for milking the said two pairs of farm animals, a milk receiving space having therein a mechanical refrigerator, said mechanical milking means further including milk line means connected to each set of teat cups and leading into said refrigerator for connection into a milk receptacle means located within said refrigerator, said mechanical milking means also further including a source of vacuum having a vacuum pipe leading to the interior of said milk receptacle means.

3. In a structure for milking farm animals and for conveying the milk to a cooled container means as it comes from the animals comprising at least one raised platform having thereon means for defining two pairs of stalls for positioning two pairs of farm animals with each pair in back to back position to the other pair and with their udders in close proximity to each other, the front portions of one pair of stalls facing away from the front portions of the other pair of stalls on said platform, and the rear portions of the said one pair of stalls facing the rear portions of the other pair of stalls, each pair of stalls comprising one stall in echelon to the other stall of that pair, mechanical milking means including four sets of teat cups located in close proximity to each other adjacent the animals' udders whereby each set may be readily attached for milking the said two pairs of farm animals, a milk receiving space having therein a mechanical refrigerator, said mechanical milking means further including milk line means connected to each set of teat cups and leading into said refrigerator for connection into a milk receptacle means located within said refrigerator, said mechanical milking means also further including a source of vacuum having a vacuum pipe leading to the interior of said milk receptacle means, and ramp means including entrance inclined portions and exit inclined portions and enclosure means separating said entrance inclined portions from said exit inclined portions.

4. In a structure for milking farm animals and for conveying the milk to a cooled container means as it comes from the animals comprising two raised platforms having thereon means for defining two pairs of stalls for positioning two pairs of farm animals with each pair in back to back position to the other pair and with their udders in close proximity to each other, the front portions of one pair of stalls facing away from the front portions of the other pair of stalls on said platform, and the rear portions of the said one pair of stalls facing the rear portions of the other pair of stalls, each pair of stalls comprising one stall in echelon to the other stall of that pair, mechanical milking means including four sets of teat cups located in close proximity to each other adjacent the animals' udders whereby each set may be readily attached for milking the said two pairs of farm animals, a milk receiving space having therein a mechanical refrigerator, said mechanical milking means further including milk line means connected to each set of teat cups and leading into said refrigerator for connection into a milk receptacle means located within said refrigerator, said mechanical milking means also further including a source of vacuum having a vacuum pipe leading to the interior of said milk receptacle means, and ramp means including entrance inclined portions and exit inclined portions and enclosure means separating said entrance inclined portions from said exit inclined portions.

5. In a structure for milking farm animals and for conveying the milk to a cooled container means as it comes from the animals comprising at least one raised platform having thereon means for defining two pairs of stalls including means for positioning two pairs of farm animals with each pair in back to back position to the other pair and with their udders in close proximity to each other, each pair of stalls comprising one stall in echelon to the other stall of that pair, mechanical milking means including four sets of teat cups located in close proximity to each other adjacent the animals' udders whereby each set may be readily attached for milking the said two pairs of farm animals, a milk receiving space, said mechanical milking means further including milk line means connected to each set of teat cups for connection into a milk receptacle means.

6. A stall arrangement for milking systems, each stall having a head end and an udder end, comprising means defining an operator's station, at least two pairs of stalls, the stalls of each pair being in substantial alignment, and the udder ends thereof being adjacent said means, the adjacent ends of one pair of said stalls being in closer proximity to each other than the udder ends of said other pair of stalls.

7. A stall arrangement for milking systems, each stall having a head end and an udder end, comprising means defining an operator's station, at least two pairs of stalls, the stalls of each pair being in substantial alignment, and the udder ends thereof being adjacent said means, the adjacent ends of one pair of said stalls being in closer proximity to each other than the udder ends of said other pair of stalls, the stall of one pair being in echelon to a stall of the other pair and being parallel thereto.

8. A stall arrangement for milking systems, each stall having a head end and an udder end, comprising means defining an operator's station, at least two pairs of stalls, the stalls of each pair being in substantial alignment, and the udder ends thereof being adjacent said means, the adjacent ends of one pair of said stalls being in closer proximity to each other than the udder ends of said other pair of stalls, the stall of each pair being in echelon to the stall of the other pair, and being parallel thereto.

9. A stall arrangement for milking systems, each stall having a head end and an udder end, comprising means defining an operator's station, at least two pairs of stalls, the stalls of each pair being in substantial alignment, and the udder ends thereof being adjacent said means, the adjacent ends of one pair of said stalls being in closer proximity to each other than the udder ends of said other pair of stalls, the operator's station spacing the udder ends of at least one pair of stalls.

10. A stall arrangement for milking systems, each stall having a head end and an udder end, comprising means defining an operator's station, at least two pairs of stalls, the stalls of each pair being in substantial alignment, and the udder ends thereof being adjacent said means, the adjacent ends of one pair of said stalls being in closer proximity to each other than the udder ends of said other pair of stalls, the said stalls forming an elevated platform, the operator's station being located below said platform whereby to facilitate the milking of farm animals stationed in said stalls.

References Cited in the file of this patent

UNITED STATES PATENTS

| | | |
|---|---|---|
| 2,024,639 | Greene | Dec. 17, 1935 |
| 2,198,048 | Babson et al. | Apr. 23, 1940 |
| 2,470,979 | Duncan | May 24, 1949 |
| 2,472,122 | Polivka | June 7, 1949 |
| 2,477,035 | Babson et al. | July 26, 1949 |
| 2,498,401 | Duncan | Feb. 21, 1950 |
| 2,557,252 | Bannister et al. | June 19, 1951 |
| 2,564,047 | Babson et al. | Aug. 14, 1951 |
| 2,631,566 | Roop | Mar. 17, 1953 |

FOREIGN PATENTS

| | | |
|---|---|---|
| 10,734 | Great Britain | 1908 |